US011224863B2

(12) United States Patent
Bortun et al.

(10) Patent No.: US 11,224,863 B2
(45) Date of Patent: Jan. 18, 2022

(54) CATALYST COMPRISING CERIA-ZIRCONIA-OXYGEN STORAGE MATERIAL AND PROCESS FOR ITS PRODUCTION

(71) Applicant: Pacific Industrial Development Corporation, Ann Arbor, MI (US)

(72) Inventors: Anatoly Bortun, Ypsilanti, MI (US); Mila Bortun, Ypsilanti, MI (US); David Shepard, South Lyon, MI (US); Yunkui Li, Ann Arbor, MI (US); Jin Cho, Utsunomiya (JP); Wei Wu, Ann Arbor, MI (US); Jeffery Lachapelle, Northville, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 0 days.

(21) Appl. No.: 16/959,460

(22) PCT Filed: Jan. 7, 2019

(86) PCT No.: PCT/US2019/012476
§ 371 (c)(1),
(2) Date: Jul. 1, 2020

(87) PCT Pub. No.: WO2019/136340
PCT Pub. Date: Jul. 11, 2019

(65) Prior Publication Data
US 2021/0069680 A1 Mar. 11, 2021

Related U.S. Application Data

(60) Provisional application No. 62/614,594, filed on Jan. 8, 2018.

(51) Int. Cl.
*B01D 53/94* (2006.01)
*B01J 23/83* (2006.01)
(Continued)

(52) U.S. Cl.
CPC ............ *B01J 23/83* (2013.01); *B01D 53/944* (2013.01); *B01D 53/945* (2013.01); *B01J 37/03* (2013.01);
(Continued)

(58) Field of Classification Search
CPC .. B01D 53/94; B01D 53/9445; B01D 53/945; B01D 53/9481; B01D 2255/206;
(Continued)

(56) References Cited

U.S. PATENT DOCUMENTS 6,139,814 A 10/2000 Nazipovich et al.
6,171,572 B1 1/2001 Aozasa
(Continued)

FOREIGN PATENT DOCUMENTS

JP H05155622 A 6/1993
JP H05193948 A 8/1993
JP 2000319019 A 11/2000

OTHER PUBLICATIONS

European Patent Office, Rijswijk, Netherlands, International Search Report of International Application No. PCT/US2019/012476, dated Apr. 16, 2019, 3 pages.

*Primary Examiner* — Timothy C Vanoy
(74) *Attorney, Agent, or Firm* — Dickinson Wright PLLC

(57) ABSTRACT

An oxygen storage material (OSM) that exhibits enhanced redox properties, developed mesoporosity, and a resistance to sintering. The oxygen storage material (OSM) has a high oxygen storage capacity (i.e., OSC>1.5 mmol $H_2$/g) and enhanced reducibility (i.e., bimodal TPR-$H_2$ profile with two $T_{max}$ in the temperature range from 150° C. to 550° C.). The OSM is suitable for use as a catalyst and a catalyst support. The method of making the oxygen storage material comprises the preparation of a solution containing zirconium, cerium, rare earth and transition metal salts, followed by the
(Continued)

co-precipitation of all constituent metal hydroxides with a base.

15 Claims, 4 Drawing Sheets

(51) Int. Cl.
*B01J 37/03* (2006.01)
*B01J 37/04* (2006.01)
*B01J 37/06* (2006.01)
*B01J 37/08* (2006.01)
*F01N 3/10* (2006.01)
*F01N 3/28* (2006.01)

(52) U.S. Cl.
CPC .............. *B01J 37/04* (2013.01); *B01J 37/06* (2013.01); *B01J 37/08* (2013.01); *F01N 3/101* (2013.01); *F01N 3/103* (2013.01); *F01N 3/28* (2013.01); *B01D 2255/2061* (2013.01); *B01D 2255/2063* (2013.01); *B01D 2255/2065* (2013.01); *B01D 2255/20715* (2013.01); *B01D 2255/20738* (2013.01); *B01D 2255/20761* (2013.01); *B01D 2255/407* (2013.01); *B01D 2255/908* (2013.01); *F01N 2370/02* (2013.01)

(58) Field of Classification Search
CPC ...... B01D 2255/2065; B01D 2255/207; B01D 2255/20715; B01D 2255/407; B01D 2255/908; B01D 2257/104; B01D 2258/012; B01J 23/10; B01J 23/70; B01J 37/00; B01J 37/03; F01N 3/0864; F01N 3/101; F01N 3/103; F01N 2250/12; F01N 2570/16

See application file for complete search history.

(56) References Cited

U.S. PATENT DOCUMENTS

| | | | |
|---|---|---|---|
| 6,214,306 | B1 | 4/2001 | Aubert et al. |
| 6,255,242 | B1 | 7/2001 | Umemoto et al. |
| 6,387,338 | B1 | 5/2002 | Anatoly et al. |
| 6,585,944 | B1 | 7/2003 | Nunan et al. |
| 7,431,910 | B2 | 10/2008 | Takao et al. |
| 7,919,429 | B2 | 4/2011 | Okamoto et al. |
| 7,927,699 | B2 | 4/2011 | Okamoto |
| 7,943,104 | B2 | 5/2011 | Kozlov et al. |
| 8,187,995 | B2 | 5/2012 | Wakita et al. |
| 2013/0029840 | A1 | 1/2013 | Morikawa et al. |
| 2015/0375203 | A1 | 12/2015 | Ohtake et al. |
| 2016/0207027 | A1 | 7/2016 | Kodama |
| 2016/0296910 | A1 | 10/2016 | Wu et al. |
| 2018/0021759 | A1* | 1/2018 | Huang .................... B01J 23/63 502/303 |

* cited by examiner

CATALYST COMPRISING CERIA-ZIRCONIA-OXYGEN STORAGE MATERIAL AND PROCESS FOR ITS PRODUCTION

CROSS REFERENCE TO RELATED APPLICATIONS

This application is a national stage filing of International Application No. PCT/US2019/012476 filed on Jan. 7, 2019, designating the United States and published in English, which claims the benefit of the filing date under 35 U.S.C. § 119(e) of U.S. Provisional Application No. 62/614,594 filed on Jan. 8, 2018, the entire contents of which are both incorporated herein by reference in their entirety.

FIELD

This disclosure relates generally to oxygen storage material that can be used for catalytic applications.

BACKGROUND

The statements in this section merely provide background information related to the present disclosure and may not constitute prior art.

Cerium-zirconium mixed oxides are widely used as oxygen storage materials (OSM) in three-way catalysts for treatment of vehicle exhaust gases. There are several requirements that OSM should meet for successful application. These requirements include high thermal stability, resistance to sintering, and compatibility with precious metals, thereby, enabling the high dispersion of these metals on the surface of the OSM.

Different methods are used to make conventional ceria-zirconia based OSM. These methods include sol-gel techniques as described in JP-A-5-193948, solid-state reactions between reagents as shown in JP-A-5-155622, and impregnation as defined within U.S. Pat. No. 6,139,814. The most common and widely used processes for making thermally stable OSM are precipitation/co-precipitation based on U.S. Pat. Nos. 6,171,572; 6,214,306; 6,255,242; 6,387,338; 7,431,910; and 7,919,429; as well as U.S. Publication No. 2016/0207027. The OSM made by a precipitation/co-precipitation technique have high resistance for sintering and, in some cases, their surface area after ageing at 1100° C. could exceed 15-25 m$^2$/g.

High oxidation-reduction activity of an OSM is a cooperative phenomenon that depends on the OSM composition, crystalline phase, surface area, type of porosity, and platinum group metal (PGM) dispersion, among other features. In U.S. Pat. No. 6,468,941 the oxygen storage capacity of severely aged (>1100° C.) ceria-zirconia based materials depends on $CeO_2$ content. More specifically, oxygen storage capacity (OSC) increases up to 1.0-1.1 mmol $H_2$/g with a $CeO_2$ content increase up to 30-35 wt. %. Further increase in $CeO_2$ content does not result in an OSC increase, which means that only a fraction of the $CeO_2$ in ceria-rich mixed oxides is available for oxygen storage. U.S. Pat. No. 8,187,995 and U.S. Publication No. 2013/0029840 describes ceria-zirconia mixed oxides with a specific cubic pyrochlore structure that exhibits an oxygen storage capacity up to 1.3-1.5 mmol $H_2$/g. High oxygen storage capacity allows a reduced amount of OSM to be used, minimizes the thickness of a coated layer, reduces backpressure, and lowers the weight and cost of a catalytic converter.

Besides high total oxygen storage capacity (OSC), another important feature of mixed oxides is the temperature at which oxidation-reduction reactions occur. Materials that enable oxidation-reduction reactions at low temperatures (e.g., high redox active materials) are important for solving cold-start emission problems by lowering the "light-off" temperature of the catalyst, thereby, reducing the amount of untreated exhaust gases. U.S. Pat. No. 7,943,104 describes the use of indium (In) and tin (Sn) dopants to facilitate oxygen mobility. The maximum temperature ($T_{max}$) for the operation of an aged OSM shifts from 550-600° C. to 350-450° C. A similar effect of facilitating the redox function by using Sn as a dopant was disclosed in U.S. Publication No. 2015/0375203. In U.S. Pat. No. 6,585,944 various transition metals, e.g., Ni, Cu, Fe, and Mn, as well as Ag and Bi are proposed for redox properties enhancement. The use of these promoters allows for an increase in OSC up to 1.5 mmol $H_2$/g and a shift in $T_{max}$ to 300-350° C.

Thus, an oxygen storage material that meet the requirements of a three-way catalyst (TWC) and four-way catalyst with high oxygen storage capacity and enhanced reducibility is desirable.

SUMMARY

This disclosure relates generally to an oxygen storage material (OSM) with enhanced redox properties, developed mesoporosity, and resistance to sintering. More specifically, the present disclosure generally provides an oxygen storage material (OSM) exhibiting high oxygen storage capacity (i.e., OSC>1.5 mmol $H_2$/g) and enhanced reducibility (i.e., bimodal TPR-$H_2$ profile with two $T_{max}$ in the temperature range from 150° C. to 550° C.). The OSM is suitable for use as a catalyst and a catalyst support. The method of making the oxygen storage material comprises the preparation of a solution containing zirconium, cerium, rare earth and transition metal salts, followed by the co-precipitation of all constituent metal hydroxides with a base.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
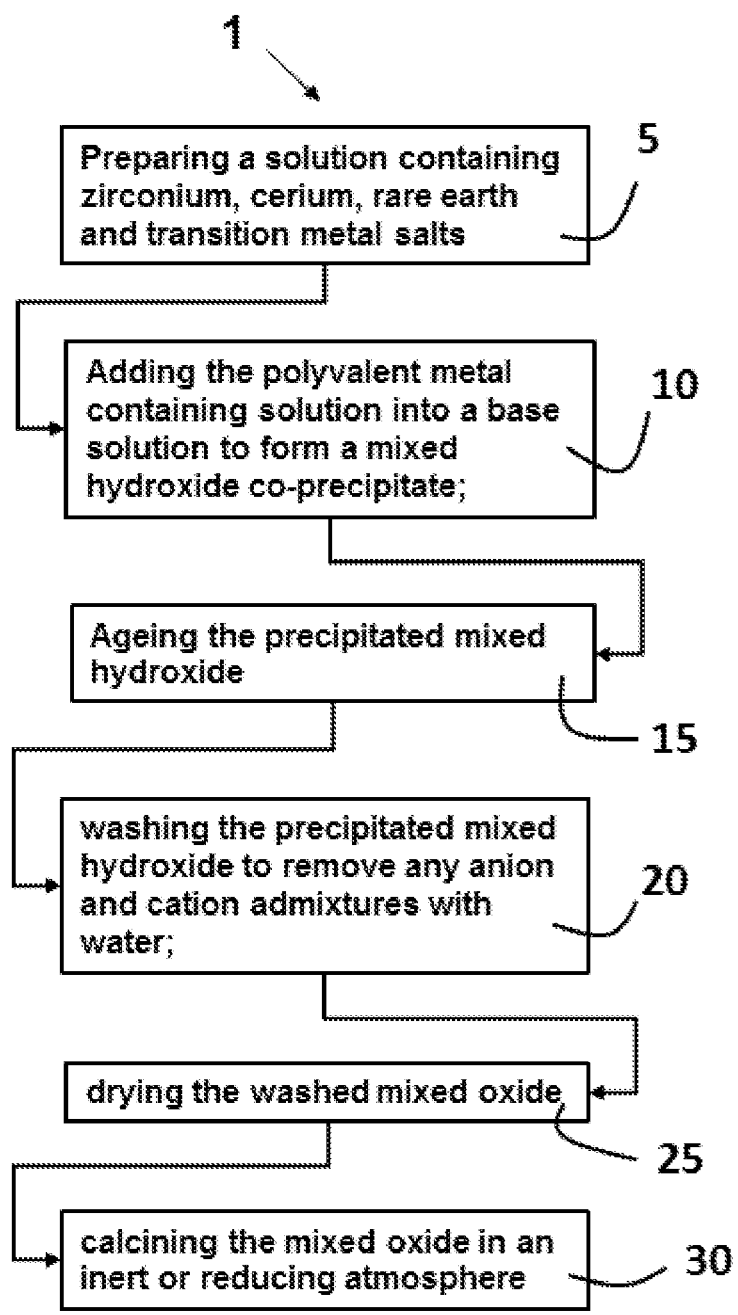
FIG. 1 is a schematic representation of a flowchart that illustrates a method for forming an oxygen storage material (OSM) according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the oxygen storage material (OSM) made and used according to the teachings contained herein is described throughout the present disclosure in conjunction with a three-way catalyst (TWC) used to reduce vehicle emission gases in order to more fully illustrate the composition and the use thereof. The incorporation and use of such an OSM in other catalysts, such as four-way catalysts, diesel oxidation catalysts, and oxidation catalysts, or in other catalytic applications is contemplated to be within the scope of the present disclosure. It should be understood that throughout the description, corresponding reference numerals indicate like or corresponding parts and features.

The present disclosure generally provides an oxygen storage material (OSM) that comprises, consists of, or consists essentially of oxides of zirconium, cerium, at least one rare earth metal other than cerium, and at least one transition metal. The OSM has a zirconium oxide content that is not less than 30% by weight and a transition metal oxide content not higher than 8 wt. % relative to the overall weight of the OSM. The OSM exhibits 100% $CeO_2$ reducibility and an oxygen storage capacity (OSC) after ageing at 1100° C. for 4 hours that is at least 1.5 mmol $H_2$/g with a bimodal TPR-$H_2$ profile.

When desirable, the OSM may have a zirconium oxide content that ranges from 30% to 80% by weight; alternatively, between about 40 wt. % and about 70 wt. % relative to the overall weight of the OSM. The cerium oxide content in the OSM may also range from 5% to 50% by weight; alternatively, between about 10 wt. % to about 45 wt. %; alternatively, from about 15 wt. % to about 35 wt. %.

According to another aspect of the present disclosure, the rare earth metals present in the OSM may be selected to include, but not be limited to, lanthanum, neodymium, praseodymium, yttrium, or combination of thereof. The content of these rare earth metals in the OSM may range from 0% up to 15% by weight; alternatively, from about 5 wt. % to 10 wt. %, relative to the overall weight of the OSM. The amount of rare earth metals present in the OSM is sufficient for stabilization of the crystalline lattice of the OSM.

The transition metals present in the OSM may be selected, without limitation, from the group of copper, iron, nickel, cobalt, manganese or combination of thereof. The amount of transition metals present in the OSM may range from 0% up to 8% by weight; alternatively, from about 1 wt. % to about 7 wt. %; alternatively, from about 2 wt. % to about 5 wt. %.

According to another aspect of the present disclosure, the oxygen storage material exhibits 100% $CeO_2$ reducibility after ageing at 1100° C. for 4 hours, which is significantly higher that has been reported previously for conventional materials. The OSM may be further characterized by having an oxygen storage capacity (OSC) after ageing at 1100° C. for 4 hours that is at least 1.5 mmol $H_2$/g; alternatively, ranging from about 1.5 mmol $H_2$/g up to about 2.5 mmol $H_2$/g along with a bimodal TPR-$H_2$ profile. The bimodal TPR-$H_2$ profile is characterized by two distinct peaks having a $T_{max}$ at 350-400° C. and at 450-550° C. or two peaks with a $T_{max}$ at 150-250° C. and at 350-450° C.

Referring now to FIG. 1, a method 1 for making an oxygen storage material (OSM) is provided. The method 1 includes the steps of (a) preparing 5 a solution containing zirconium, cerium, rare earth and transition metal salts, (b) adding 10 the polyvalent metal containing solution into a base solution to form a mixed hydroxide co-precipitate; (c) ageing 15 the precipitated mixed hydroxide; (d) washing 20 the precipitated mixed hydroxide with water to remove anion and cation admixtures; (e) drying 25 the washed mixed oxide; and (f) calcining 30 the mixed oxide in an inert or reducing atmosphere.

In preparing 5 the salt solution, the method 1 uses water soluble polyvalent metal nitrates, chlorides, sulfates salts of zirconium, rare earth metals, transition metals and combination of thereof. The base used for precipitation 10 is chosen from alkali hydroxides, aqueous ammonia or tetraalkylammonium hydroxide. The calcination 30 of air-dried material is done in an inert or reducing atmosphere. The calcination 30 is carried out at temperature ranging from about 500° C. up to 900° C. for time from about 2 to 5 hours; alternatively, at a temperature in the range of about 600° C. to about 800° C. and/or a time between about 3 hours to about 5 hours.

For the purpose of this disclosure the terms "about" and "substantially" are used herein with respect to measurable values and ranges due to expected variations known to those skilled in the art (e.g., limitations and variability in measurements).

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

The following specific examples are given to illustrate the oxygen storage material (OSM), formed according to the teachings of the present disclosure, as well as the properties thereof and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1

A solution containing Zr, Ce, La, Y, and Fe salts is prepared by mixing 90.5 g of $ZrOCl_2 \cdot 8H_2O$, 64.5 g of a 27.9% cerium (III) nitrate solution, 15.55 g of a 19.3% yttrium nitrate solution, 11.85 g of a 18.3% lanthanum nitrate solution, and 18.2 g of an $Fe(NO_3)_3 \cdot 6H_2O$ with 200 g of deionized (DI) water. The solution containing the polyvalent metals is added dropwise into a one liter beaker with 700 g of a 25% $NH_4OH$ solution. The formed precipitate is filtered using a Buchner filter and washed with deionized water to remove any excess of chloride, nitrate and ammonium ions.

The wet collected precipitate is dried in electric oven at 130° C. for 12 hours. Then the dried precipitate is calcined at 800° C. for 2 hours in a nitrogen atmosphere. The calcined sample is additionally aged at 1100° C. in air for 4 hours.

Figure 2:
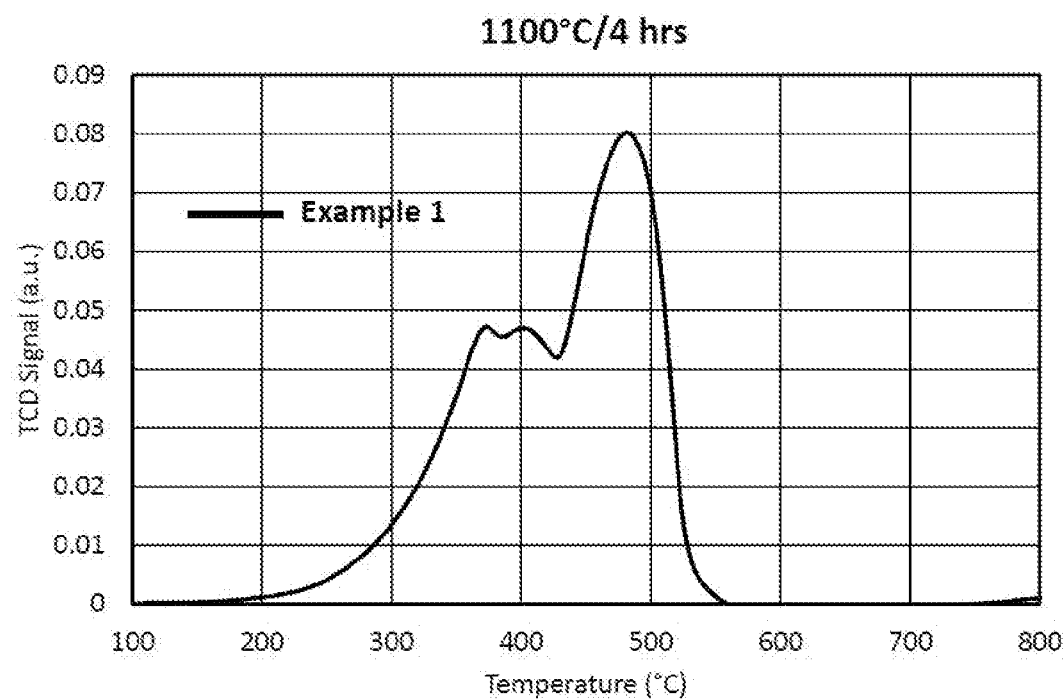
FIG. 2 is a graphical representation of a TPR-$H_2$ profile of the OSM of Example 1 after ageing at 1,100° C. for 4 hours.

The redox activity of aged OSM is tested using a conventional temperature programmed reduction (TPR-$H_2$) method. Theoretical oxygen storage capacity (OSC) is 1.75 mMol $H_2$/g. Thus, the available OSC of 1.75 mMol $H_2$/g indicates that all Ce is available for redox reactions. The TPR-$H_2$ profile exhibits two peaks at $T_{max}$=370° C. and $T_{max}$=480° C. as shown in FIG. 2.

Example 2

A solution containing Zr, Ce, La, Y, and Cu salts is prepared by mixing 58.1 g of $ZrOCl_2*8H_2O$, 96.8 g of a 27.9% cerium (III) nitrate solution, 15.55 g of a 19.3% yttrium nitrate solution, 11.85 g of a 18.3% lanthanum nitrate solution, and 14.46 g of $Cu(NO_3)_2*3H_2O$ with 200 g of deionized (DI) water. The solution containing the polyvalent metals is added dropwise into a one liter beaker containing 700 g of a 10% NaOH solution. The formed precipitate is filtered using a Buchner filter and washed with deionized water to remove any excess of chloride, nitrate and sodium ions.

The wet collected precipitate is dried in electric oven at 130° C. for 12 hours and then calcined in a nitrogen atmosphere at 800° C. for 2 hours. The calcined sample is additionally aged at 1100° C. in air for 4 hours.

Figure 3:
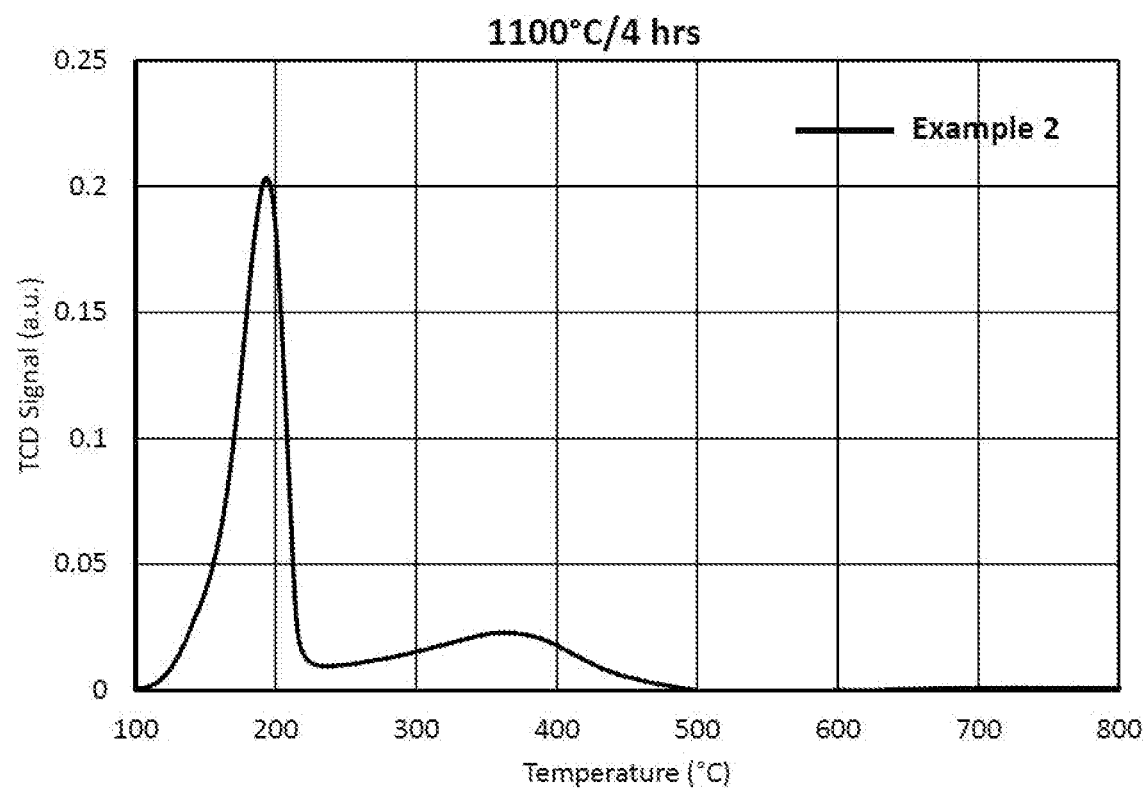
FIG. 3 is a graphical representation of a TPR-$H_2$ profile of the OSM of Example 2 after ageing at 1,100° C. for 4 hours.
Figure 4:
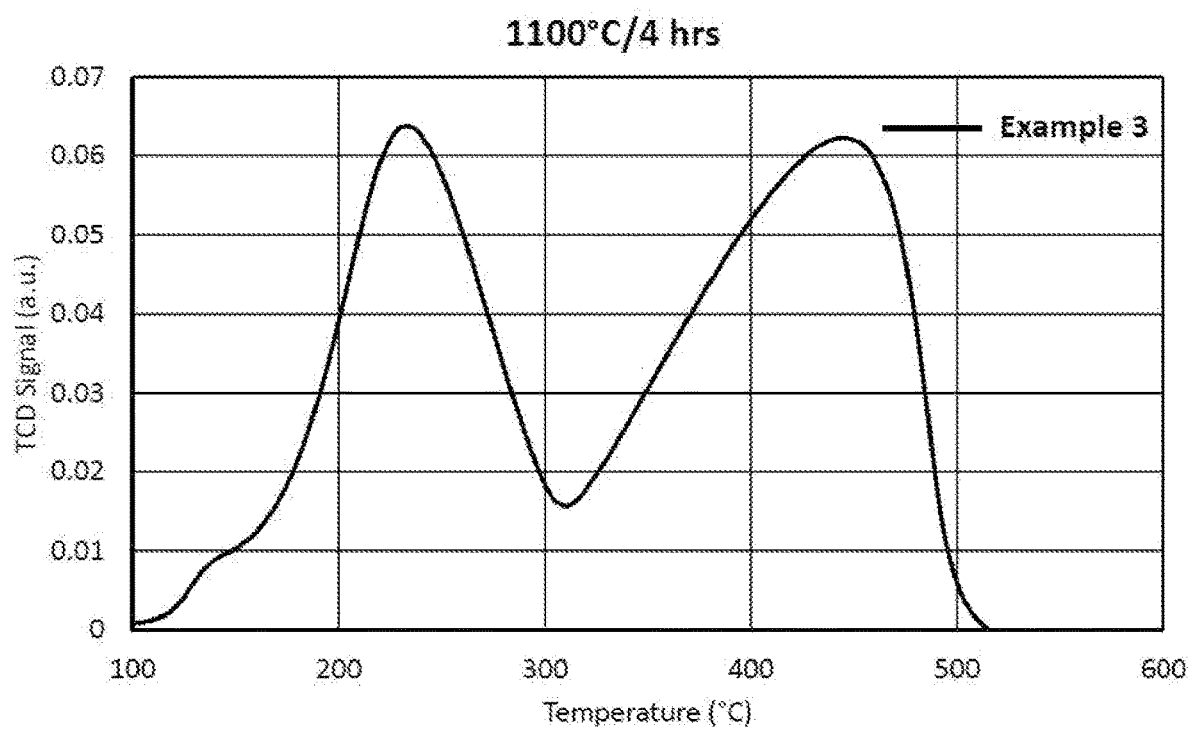
FIG. 4 is a graphical representation of a TPR-$H_2$ profile of the OSM of Example 3 after ageing at 1,100° C. for 4 hours.

The redox activity of the aged OSM is tested using a conventional TPR-H2 method. The theoretical OSC is 2.15 mMol $H_2$/g. The available OSC of 2.15 mMol $H_2$/g indicates that 100% Ce is available for redox reactions. The TPR-H2 profile exhibits two peaks at $T_{max}$=190° C. and $T_{max}$=350° C. as shown in FIG. 3.

Example 3

A solution containing Zr, Ce, La, Y, Cu and Fe salts is prepared by mixing 50.25 g of $ZrOCl_2*8H_2O$, 107.5 g of a 27.9% cerium (III) nitrate solution, 15.55 g of a 19.3% yttrium nitrate solution, 11.85 g of a 18.3% lanthanum nitrate solution, 0.9 g of $Cu(NO_3)_2*3H_2O$ and 22.7 g of $Fe(NO_3)_3*6H_2O$ with 200 g of deionized (DI) water. The solution containing the polyvalent metals is then added dropwise into a one liter beaker containing 700 g of a 10% NaOH solution. The formed precipitate is filtered using a Buchner filter and washed with deionized water to remove any excess chloride, nitrate and sodium ions.

The wet collected precipitate is dried in electric oven at 130° C. for 12 hours and then calcined at 800° C. for 2 hours in a 5 wt. % CO atmosphere. The calcined sample is additionally aged at 1100° C. in air for 4 hours.

The redox activity of the aged OSM is tested using a conventional TPR-$H_2$ method. The theoretical OSC is 2.50 mMol $H_2$/g. The available OSC of 2.5 mMol $H_2$/g indicates that 100% Ce is available for redox reactions. The TPR-$H_2$ profile exhibits two peaks at $T_{max}$=225° C. and $T_{max}$=440° C. as shown in FIG. 3.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An Oxygen Storage Material (OSM) consisting of oxides of zirconium, cerium, at least one rare earth metal other than cerium, and at least one transition metal;
   wherein the OSM has a zirconium oxide content that is not less than 30% by weight and transition metal oxide content not higher than 8% by weight relative to the overall weight of the OSM;
   wherein the OSM exhibits 100% $CeO_2$ reducibility and an oxygen storage capacity (OSC) after ageing at 1100° C. for 4 hours that is at least 1.5 mmol $H_2$/g with bimodal TPR-$H_2$ profile.

2. The Oxygen Storage Material according to claim 1, wherein the OSM has zirconium oxide content from 30% to 80% by weight relative to the overall weight of the OSM.

3. The Oxygen Storage Material according to claim 1, wherein the OSM has cerium oxide content from 5% to 50% by weight relative to the overall weight of the OSM.

4. The Oxygen Storage Material according to claim 1, wherein the rare earth metals are selected from the group lanthanum, neodymium, praseodymium, yttrium or combination of thereof.

5. The Oxygen Storage Material according to claim 1, wherein the rare earth metal oxides content is greater than 0% up to 15% by weight relative to the overall weight of the OSM.

6. The Oxygen Storage Material according to claim 1, wherein the transition metals are selected from the group of copper, iron, nickel, cobalt, manganese or combination of thereof.

7. The Oxygen Storage Material according to claim 1, wherein the transition metals oxides content is greater than 0% up to 8% by mass.

8. The Oxygen Storage Material according to claim 1, wherein the OSM has oxygen storage capacity after ageing at 1100° C. for 4 hours ranging from 1.5 mmol $H_2$/g up to 2.5 mmol $H_2$/g with a bimodal TPR-$H_2$ profile exhibiting a low temperature $T_{max}$ at 350-400° C. and a high temperature $T_{max}$ at 450-550° C.

9. The Oxygen Storage Material according to claim 1, wherein the OSM has oxygen storage capacity after ageing at 1100° C. for 4 hours ranging from 1.5 mmol $H_2$/g up to 2.5 mmol $H_2$/g with bimodal TPR-$H_2$ profile exhibiting a low temperature $T_{max}$ at 150-250° C. and a high temperature $T_{max}$ at 350-450° C.

10. A method for making the oxygen storage material (OSM) of claim 1, the method comprising the steps of:
    (a) preparing a polyvalent metal containing solution containing zirconium, cerium, rare earth and transition metal salts,
    (b) adding the polyvalent metal containing solution into a base solution to form a mixed hydroxide co-precipitate (c) ageing the precipitated mixed hydroxide;
(d) washing the precipitated mixed hydroxide with water to remove any anion and cation admixtures;
(e) drying the washed mixed hydroxide; and
(f) calcining the dried mixed hydroxide in an inert or reducing atmosphere.

11. The method for making Oxygen Storage Material according to claim 10 wherein the polyvalent metal-containing solution consists of water soluble nitrate, chloride, or sulfate salts of zirconium, rare earth metals, transition metals, and a combination thereof.

12. The method for making Oxygen Storage Material according to claim 10, wherein the base is selected from the group of alkali metal hydroxides, aqueous ammonia, or tetraalkylammonium hydroxide.

13. The method for making Oxygen Storage Material according to claim 10, wherein the calcination in the inert or reducing atmosphere is carried out at temperature ranging from 500° C. up to about 900° C. for a time ranging from 2 up to about 5 hours.

14. The use of the OSM formed according to the method of claim 10 in a three-way catalyst, a four-way catalyst, a diesel oxidation catalyst, or an oxidation catalyst for treatment of vehicles exhaust gases.

15. The use of the OSM of claim 1 in a three-way catalyst, a four-way catalyst, a diesel oxidation catalyst, or an oxidation catalyst for treatment of vehicles exhaust gases.

* * * * *